(12) United States Patent
Raventós Sánchez et al.

(10) Patent No.: US 12,343,939 B2
(45) Date of Patent: Jul. 1, 2025

(54) MACHINE FOR ADDITIVE MANUFACTURING AND RELATED METHOD OF ADDITIVE MANUFACTURING

(71) Applicant: SUPERNOVA INDUSTRIES CORP., Wilmington, DE (US)

(72) Inventors: Oriol Raventós Sánchez, Barcelona (ES); Eric Pallarés García, Barcelona (ES)

(73) Assignee: SUPERNOVA INDUSTRIES CORP., Wilmington, DE (US)

( * ) Notice: Subject to any disclaimer, the term of this patent is extended or adjusted under 35 U.S.C. 154(b) by 123 days.

(21) Appl. No.: 17/911,313

(22) PCT Filed: Mar. 15, 2021

(86) PCT No.: PCT/ES2021/070183
§ 371 (c)(1),
(2) Date: Mar. 21, 2023

(87) PCT Pub. No.: WO2021/180997
PCT Pub. Date: Sep. 16, 2021

(65) Prior Publication Data
US 2023/0111118 A1    Apr. 13, 2023

(30) Foreign Application Priority Data
Mar. 13, 2020   (ES) .............. ES202030212

(51) Int. Cl.
*B29C 64/245* (2017.01)
*B29C 64/218* (2017.01)
(Continued)

(52) U.S. Cl.
CPC .......... *B29C 64/245* (2017.08); *B29C 64/218* (2017.08); *B29C 64/232* (2017.08);
(Continued)

(58) Field of Classification Search
CPC ... B29C 64/106; B29C 64/124; B29C 64/135; B29C 64/218; B29C 64/223;
(Continued)

(56) References Cited

U.S. PATENT DOCUMENTS 5,650,260 A    7/1997   Onishi
6,066,285 A    5/2000   Kumar
(Continued)

FOREIGN PATENT DOCUMENTS

CN      105729812 B     10/2017
KR      20040032514 A   4/2004
WO      2020005717 A1   1/2020

*Primary Examiner* — Yunju Kim
(74) *Attorney, Agent, or Firm* — Vivacqua Crane, PLLC

(57) ABSTRACT

A machine that enables the additive manufacturing of parts making use of high viscosity resins and comprises a structure; a conveying module, with a movable support and a displacement mechanism, to house and move the printing surface in a vertical direction; a light source, at least one reservoir of material; a material supply module, connected to the reservoir of material and configured for applying a layer of printing material on a conveyor substrate, which conveys the layer of printing material from the material supply module to the printing surface, wherein it is cured; and a fastening system, to fasten and move the conveyor substrate.

23 Claims, 10 Drawing Sheets

(51) Int. Cl.
    *B29C 64/232*      (2017.01)
    *B29C 64/236*      (2017.01)
    *B29C 64/268*      (2017.01)
    *B29C 64/35*      (2017.01)
    *B29C 64/357*      (2017.01)
    *B33Y 10/00*      (2015.01)
    *B33Y 30/00*      (2015.01)
    *B33Y 40/00*      (2020.01)
    *B33Y 70/00*      (2020.01)

(52) U.S. Cl.
    CPC .......... *B29C 64/236* (2017.08); *B29C 64/268* (2017.08); *B29C 64/35* (2017.08); *B29C 64/357* (2017.08); *B33Y 10/00* (2014.12); *B33Y 30/00* (2014.12); *B33Y 40/00* (2014.12); *B33Y 70/00* (2014.12)

(58) Field of Classification Search
    CPC ... B29C 64/227; B29C 64/232; B29C 64/236; B29C 64/245; B29C 64/264; B29C 64/268; B29C 64/321; B29C 64/35; B29C 64/357; B33Y 10/00; B33Y 30/00; B33Y 40/00; B33Y 70/00
    See application file for complete search history.

(56) References Cited

U.S. PATENT DOCUMENTS

| | | |
|---|---|---|
| 2008/0206383 A1* | 8/2008 | Hull ...................... B33Y 30/00 425/135 |
| 2012/0045617 A1 | 2/2012 | Yasukochi et al. |
| 2012/0168989 A1 | 7/2012 | Vermeer et al. |
| 2012/0195994 A1 | 8/2012 | El-Siblani et al. |
| 2017/0246796 A1* | 8/2017 | Bauer ................... B29C 64/129 |
| 2019/0351609 A1 | 11/2019 | Thau et al. |
| 2021/0187859 A1* | 6/2021 | Gmeiner ............... B29C 64/393 |

\* cited by examiner

MACHINE FOR ADDITIVE MANUFACTURING AND RELATED METHOD OF ADDITIVE MANUFACTURING

This patent application claims priority from PCT Application No. PCT/ES2021/070183 filed Mar. 15, 2021, which claims priority from Spanish Patent Application No. P202030212 filed Mar. 13, 2020. Each of these patent applications are herein incorporated by reference in their entirety.

OBJECT OF THE INVENTION

The present invention falls within the systems for producing parts by means of additive manufacturing. In particular, it relates to 3D printers, which produce parts layer by layer.

An object of the present invention is a machine capable of producing three-dimensional parts layer by layer, quickly and efficiently. Furthermore, the machine of the invention enables high viscosity resin and filled resin to be used, as well as multi-material parts to be obtained.

Another object of the present invention is a method of additive manufacturing of three-dimensional parts by means of additive manufacturing techniques, which makes use of the machine of the invention and enables medium and large-sized parts to be obtained, avoiding the use of large vats of photosensitive printing material.

BACKGROUND OF THE INVENTION

Additive manufacturing technology using stereolithography was invented in the 1980s and worked by means of a light source, located in the upper portion, which focussed an ultraviolet light beam (laser) by means of which it solidified the resin that was inside a resin tank, located in the lower portion. However, the maintenance of these machines involves a high cost due to the large volume of the resin tank.

Subsequently, additive manufacturing was improved, with improvements such as those implemented by Envision-Tec, which used a DLP projector as a light source and inverting the elements, arranging the resin in a reservoir with a transparent or translucent base, and with the light source at the lower portion thereof. The use of a reservoir of material has limitations regarding the use of certain materials and regarding the measurement of the printing volume.

Many of the solutions found are based on bottom-up manufacturing systems, which limit the use of printing materials to low-viscosity resins.

In the case of localised top-down type systems, said systems involve the use of a large vat of printing material, which considerably increases the cost of use and maintenance.

Other manufacturing methods using transparent substrates have also been found; however, in general, the additive manufacturing systems developed suffer from the same limitations as the systems already discussed, due to the use of reservoirs or vats of material, which reduce flexibility in the supply of one or more materials of different types and even high viscosity materials or materials loaded with reinforcement materials.

DESCRIPTION OF THE INVENTION

The present invention relates to a machine for additive manufacturing that enables high viscosity printing materials to be used, in particular, resins with a viscosity greater than or equal to 2000 cps (mPa*s) at 25° C., and materials loaded with reinforcement material. Moreover, it enables different materials to be used for manufacturing a part, whether they are materials with different mechanical properties or different colours.

The machine can have different sizes, such that it enables medium and large-sized parts to be produced, maintaining the advantages of enabling the use of high viscosity printing materials with good mechanical properties or even with reinforcement material.

Furthermore, the machine enables parts to be manufactured which include areas produced with expendable supporting materials, reducing the need to make modifications to the part to obtain the final geometry thereof.

The machine of the invention comprises, firstly, a structure, which will be in charge of housing all the elements that make up the machine.

Additionally, the machine comprises a conveying module, which in turn comprises a movable support, and a displacement mechanism connected to the structure.

The conveying module will be in charge of enabling the part to be produced layer by layer, the conveying module being intended to house, by means of the movable support, a printing surface, on which the part to be built will be printed. Thus, the conveying module enables the printing surface to be moved in a vertical direction, depending on the height of the layers of the part already produced. Preferably, the printing surface and the movable support can form a single element.

The displacement mechanism of the conveying module can comprise one or more spindles that transmit a movement guided by linear displacement guide elements connected to the movable support. Thus, the displacement mechanism produces a vertical movement in the movable support by means of the guide elements.

Additionally, the conveying module can further comprise an automatic levelling mechanism, system or routine with a positioning frame intended to house the printing surface and attached to the movable support, such that it enables the positioning of the printing surface to be adjusted with respect to the conveyor substrate. The automatic levelling mechanism, system or routine can be carried out by means of a mechanism, using electronics, using sensing elements or programming routines.

The machine further comprises at least one light source, preferably ultraviolet or visible light, fixed to the structure, and preferably located above the working surface, which will be in charge of curing the printing material. The light will preferably be configured to produce a light beam with a predetermined shape, which cures the desired portion of the layer of printing material that is applied to the part being built.

The light source can be a projector, a screen or a laser, correctly calibrated and located to obtain the appropriate resolution and printing area.

The machine makes use of a photosensitive printing material that is cured by means of light, generated by the light source. Preferably, the printing material used is high viscosity photosensitive resin or, alternatively, photosensitive resin filled with reinforcement material.

Likewise, the machine comprises at least one reservoir of material, located in the structure and intended to contain a printing material. The reservoir of material stores the printing material, but is preferably removable, in order to facilitate the exchange of the same to replace materials.

Also, the machine of the invention comprises at least one material supply module, connected to the reservoir of material. The material supply module is intended to apply a layer of printing material on a conveyor substrate.

The at least one material supply module can comprise a cartridge and a material supply roller for applying the layer of printing material onto the conveyor substrate. In this case, the material supply roller would be located tangentially to at least one rotating element of a fastening system.

In order to control the thickness of the layer of printing material that is applied on the conveyor substrate, the material supply module can further comprise a thickness control module. The thickness control module comprises a runner, connected to the cartridge and the supply roller, which moves linearly, and a supply motor, which drives the movement of the runner. The displacement of the runner driven by the supply motor enables the distance of the supply roller from the rotating element of the fastening system to be varied, and therefore enables the thickness of the layer of material supplied to the conveyor substrate to be varied.

The conveyor substrate is interchangeable and is intended for transporting the printing material from the material supply module to the printing surface. Likewise, it is transparent, such that it enables the light generated by the light source to pass therethrough, in order to reach the printing material and cure it on the part to be built.

The machine of the invention further comprises the fastening system, which comprises one or more fixing elements, at least two rotating elements and one or more displacement motors. Preferably, the fastening system can comprise a central and movable fixing element and four rotating elements, two upper and two lower rotating elements. Alternatively, the fastening system can comprise two fixing elements and two rotating elements.

Preferably, the central and movable fixing element of the fastening system is located on linear guides and is intended to hold the conveyor substrate at two ends to the structure at an upper level and parallel to the working surface. The fixing element moves on the linear guides alternately, in two directions, to produce a movement in the conveyor substrate.

In this case, preferably, the substrate is connected to the central and movable fixing element by means of two connecting bars which are fixed to the two ends of the substrate, for example by means of a loop or by means of a clip, and are connected to the fixing element by means of two C-shaped fixing elements.

Alternatively, in the event that there are two fixing elements, the fixing elements of the fastening system are located on linear guides and are intended to hold the transparent conveyor substrate to the structure. The fixing elements can move on the linear guides to produce a movement in the conveyor substrate.

The fastening system makes use of the rotating elements with respect to the structure. Said rotating elements are intended to serve as support points for the conveyor substrate.

Preferably, the conveyor substrate is positioned in an O-shape, being held at both ends by the central and movable fixing element, by means of the connecting bars. Thus, the conveyor substrate extends in a horizontal direction towards a first rotating element, changes direction by resting on said first rotating element, and extends in a vertical direction with a certain inclination towards a second rotating element, the substrate resting on said second rotating element, changes direction once more and extends in a horizontal direction going across the working surface towards a third rotating element, resting on this rotating element, changes direction and extends upwards in a vertical direction with a certain inclination, symmetrical to the downward inclination, and rests on a fourth rotating element and extends in a horizontal direction to be held by a second end to the central and movable fixing element.

Alternatively, the conveyor substrate is positioned in a U-shape, being held at a first end by a first fixing element, extends downwards in a vertical direction, changes direction by resting on a first rotating element, extends in a horizontal direction towards a second rotating element, changes direction once more by resting on the second rotating element, extends upwards in a vertical direction and is held at a second end by a second fixing element.

In the movement of the fixing elements, the conveyor substrate moves and causes a rotation in the rollers. The movement of the fixing elements is controlled by one or more displacement motors that are connected to said fixing elements to move the conveyor substrate. In the movement of the conveyor substrate, the fixing elements are preferably moved in the horizontal direction if there is one fixing element or in the vertical direction and opposite ways if there are more fixing elements, to give movement to the conveyor substrate.

Preferably, in the case that there are 4 rotating elements, the tensioning of the conveyor substrate is carried out by means of a tensioning system connected to the two upper rotating elements. The tensioning system enables the upper rotating elements to move closer or away from each other through the movement of a central transverse spindle. Thus, the tensioning system is compressed when placing the conveyor substrate, that is, the rotating elements are brought closer together, and once the substrate is placed, they move away until the desired tension is reached, preferably until motor step losses are detected.

Alternatively, when there are two fixing elements, the fixing elements are clamp-like elements and comprise a lower block and an upper block. The lower block comprises, in turn, an adjusting screw to engage the conveyor substrate and also a self-tensioning motor that enables the conveyor substrate to be automatically tensioned. The upper block comprises a tilting element, which enables the conveyor substrate to be aligned.

The machine of the invention can further comprise a material collection module, which in turn comprises an excess material collection tray, a material filter and a recirculation conduit, which directs the collected material towards the cartridge or towards the reservoir. Thus, the uncured material is directed towards the excess material collection tray, the material from the tray is collected by the recirculation conduit, and sent to the cartridge or to the reservoir, having been previously filtered it.

In order to direct the uncured material towards the material collection tray, the material collection module also comprises a spatula. The spatula is placed near the conveyor substrate, to press it and thus recover the excess material. Preferably, the spatula can move closer to or be removed from the conveyor substrate; thus, the material collection module can further comprise an activation mechanism that causes a vertical displacement in the spatula.

Likewise, the machine of the invention can further comprise a cleaning module, intended to clean the upper surface of the last layer produced of the part being built.

Preferably, the cleaning module can comprise two rollers with a soft material arranged thereon, a cleaning motor for moving the rollers and a cleaning substrate that extends over the two rollers in a circular shape. Thus, the cleaning substrate rests on the rollers, such that it can rotate continuously, driven by the cleaning motor.

In order to move the cleaning substrate closer to the part and remove it once its function has carried out, a base, a runner and a linear guide can be arranged in the cleaning module. Thus, the runner connects to the base and moves along the linear guide. The base, moreover, connects with the rollers and enables them to be moved vertically.

Likewise, the cleaning module can further comprise a waste collection element and a solvent material application element, to clean the printing surface.

And additionally, said cleaning module can further comprise one or more radiation sources installed in the structure. Said radiation sources enable the printing surface to be dried.

The invention further relates to a method of additive manufacturing of parts by means of additive manufacturing. The method of the invention makes use of the described machine to enable additive manufacturing parts with high efficiency and precision to be produced.

The method of the invention comprises a first step of providing a conveyor substrate placed in the fastening system. This step can be done manually or automatically. Preferably, it is done manually, loosening the already used conveyor substrate, removing it from the structure by disengaging the fixing means(s) and placing a new conveyor substrate in the fastening system.

Next, the conveyor substrate is automatically tensioned by means of the fastening system or the tensioning system. In particular, when the substrate is arranged in an O-shape, the tensioning system moves the upper rotating elements, tensioning the substrate. In the event that the substrate is arranged in a U-shape, the machine can comprise a self-tensioning motor, in charge of providing the exact tension to the conveyor substrate.

Preferably, at this time, the automatic levelling mechanism, system or routine of the conveying module is activated in order to ensure the coplanarity of the printing surface with respect to the conveyor substrate, remaining calibrated for the rest of the printing process.

Next, the light source is activated, which will be used to cure the printing material.

Then, the material supply module is placed, at a distance equal to the desired layer thickness of the conveyor substrate. In the event that the material supply roller is incorporated, this roller is placed at a distance equal to the desired layer thickness of the conveyor substrate.

Once the material supply module has been placed, the fastening system moves, in order to start the movement of the conveyor substrate. This is achieved, in the event that the substrate is arranged in an O-shape, by moving the fixing element on the horizontal axis parallel to the working surface alternately in two directions (left and right). In the event that the substrate is arranged in a U-shape, the movement thereof is achieved by lowering the first fixing element and, at the same time, lifting the second fixing element.

During the movement of the conveyor substrate, printing material is supplied to the lower face of said conveyor substrate along a previously defined working length. In the event that material has been supplied along the working length and the movement of the fixing element(s) has not finished, preferably, the material supply is stopped by means of the material supply module and the movement of the fastening system is continued until the fixing element(s) reach an extreme lower position, that is, position wherein they cannot move further without colliding with one of the rotating elements. The material supply is carried out by means of the material supply module located under the first fixing element.

Once the movement of the conveyor substrate has been completed, the conveying module is moved in order to lift the working surface to a distance from the conveyor substrate equal to the thickness of previously produced layers plus the thickness of the new layer placed on the conveyor substrate.

The uncured printing material is then irradiated by means of the light source, which produces a predetermined shape and cures the layer of the conveyor substrate according to said shape. The exposure time in each case is determined by the light source, the type of printing material and the layer thickness.

Once the layer of the conveyor substrate has cured, the conveying module is lowered, peeling the cured layer off the conveyor substrate, and leaving behind any excess uncured printing material. Next, the steps of moving the fastening system, supplying printing material, lifting the working surface, irradiating the printing material and lowering the conveying module are repeated, in order to produce successive layers of the part.

The method of the invention can further comprise an additional step of activating the material collection module, in order to remove uncured material. Said material is recycled by reintroducing it back into the material supply module.

In a preferred embodiment of the method of the invention, use is made of a machine comprising a first material supply module with a first cartridge containing a first printing material and at least one second material supply module with a second cartridge comprising a second printing material. This configuration enables alternately supplying a printing material in each movement of the conveyor substrate. In this configuration, the first printing module, located on one of the sides of the structure, contains a first printing material in the cartridge thereof, which is supplied to the conveyor substrate when the fixing element(s) move in one direction, while when they move in the opposite direction, the second material supply module is the one that supplies the second printing material to the conveyor substrate, so that in each movement of the conveyor substrate one printing material or another is alternately supplied. This configuration can comprise more material supply modules that enable the use of two or more different materials at the same time.

In one embodiment, the first printing material and the second printing material can be supplied in successive layers, so that the layer of the first printing material is followed by a layer of a second printing material, placed thereon.

Alternatively, the conveying module can be moved so that once the layer of the first printing material has been placed, the layer of the second printing material is placed at the same height as the layer of the first printing material. For this, the conveying module, when placing the layer of the second printing material, is moved towards the conveyor substrate up to a distance equal to the set of thicknesses already printed, so that the second printing material is added to the same layer as the first printing material.

Preferably, the printer of the invention can comprise a displacement mechanism connected to the fastening system, so that upon completion of the downward movement of the conveyor substrate after placing the first and second material, the displacement mechanism moves the conveying module laterally to a new reference position aligned with a secondary supply module, similar to the previously described supply module but loaded with two new materials. Once the fastening system is relocated, the described operating cycle is repeated to cure the portions corresponding to each material.

Alternatively, the printer of the invention can comprise a secondary supply module, loaded with two new materials, and a displacement mechanism connected to the supply modules, such that, upon completion of the movement of the conveyor substrate after placing the first and the second material, the supply modules are moved laterally to locate the secondary supply module in a reference position aligned with the movement of the conveyor substrate. Using the same conveyor substrate for both supply modules, the cleaning system should perfectly clean the cleaning substrate, thus enabling the material of the secondary supply module to come into contact with the cleaning substrate, which is clean.

The printer of the invention can further comprise a second conveyor substrate connected to the secondary supply module. Thus, the supply of the new materials included in the secondary supply module can be carried out without needing to use one single conveyor substrate.

Preferably, once a layer of the first printing material has been placed, the cleaning module is activated, which cleans the newly created surface of the part to be built, to avoid contamination with the layer of the second printing material.

Preferably, the printing direction is of the top-down type and the part is printed from the lower area thereof towards the upper area, starting with the printing surface at the upper portion of the printing volume and moving towards the lower portion as the layers follow one another.

Likewise, the machine of the invention enables reducing the waste produced, reducing the amount of conveyor substrate that is used, as it is the same that is reused after the solidification of each layer of the printing material on a part to be built. Likewise, the use of resin is reduced, thanks to the printing material recycling system.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

PREFERRED EMBODIMENT OF THE INVENTION

The invention relates to a machine that enables the additive manufacturing of parts layer by layer. The printer of the invention enables the consumption of conveyor substrate (2) and printing material to be reduced due to the configuration thereof, which will be explained below by means of preferred exemplary embodiments shown in FIGS. 1 to 10.

Figure 1:
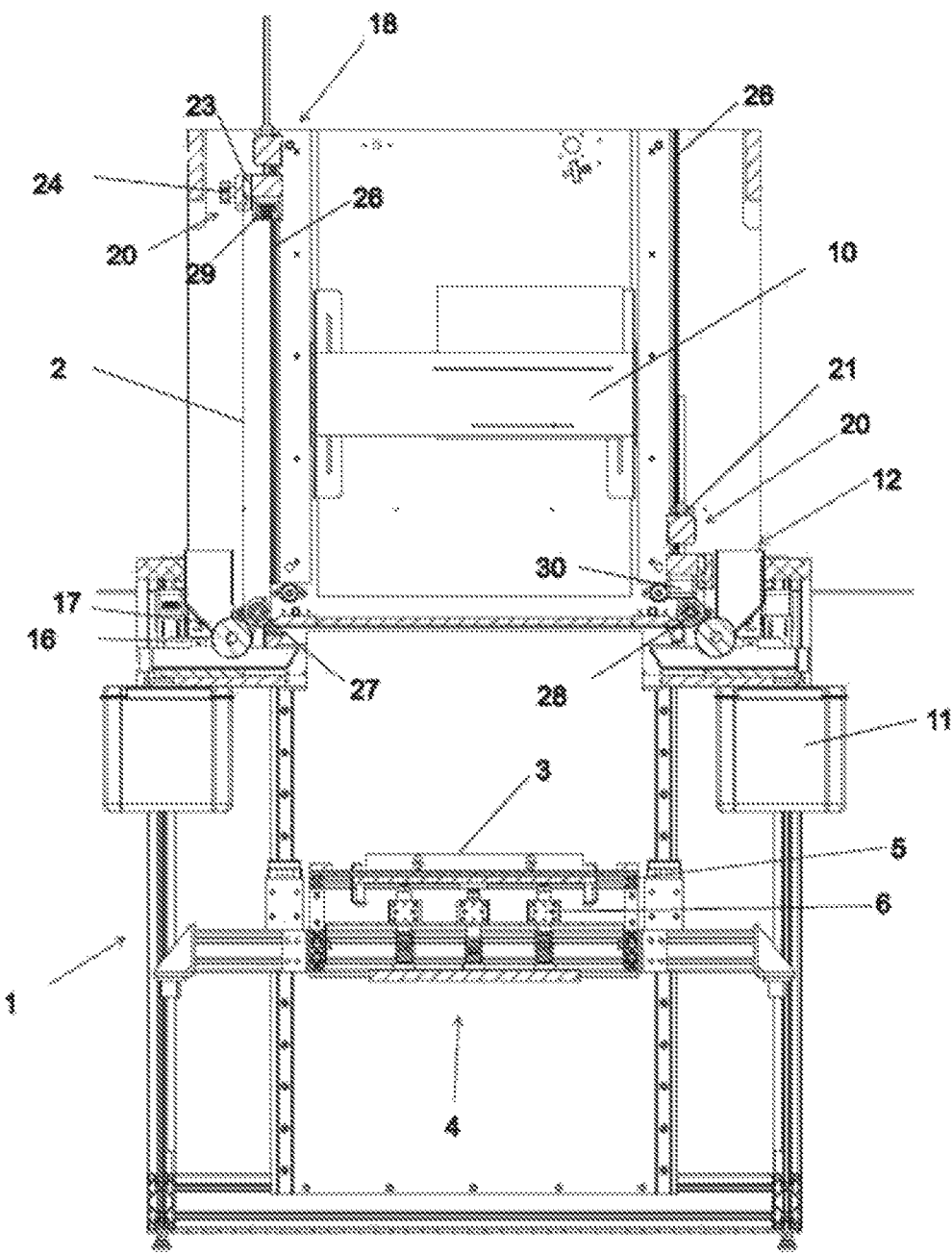
FIG. 1 shows a schematic view of a preferred embodiment of the machine of the invention.

FIG. 1 shows a schematic view of the machine as a whole. The printer has a structure (1), on which different modules are mounted that enable parts to be produced by means of additive manufacturing.

In particular, the machine comprises a conveying module (4), an ultraviolet light source (10), two reservoirs (11) of material, two material supply modules (12), a fastening system (18) and a material collection module (31).

The operation thereof is based on the use of a conveyor substrate (2) that is responsible for transferring a printing material to the part, layer by layer.

Figure 2:
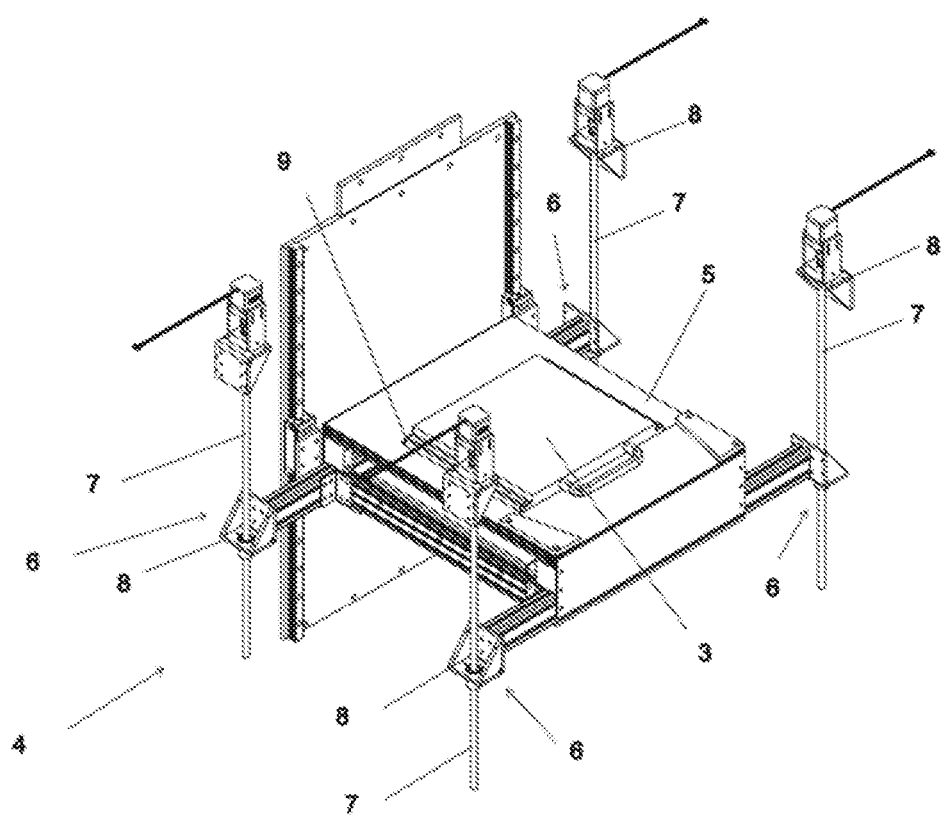
FIG. 2 shows a schematic view of a preferred embodiment of the conveying module.

FIG. 2 shows a schematic view of the conveying module (4) of the machine of the invention.

The conveying module (4) in turn comprises a movable support (5), a printing surface (3) and a displacement mechanism (6). Thus, the part to be built will be produced layer by layer on the printing surface (3), which is moved by means of the displacement mechanism (6).

The displacement mechanism (6) is connected to the movable support (5), and produces an upward and downward movement in the same. Moreover, the movable support (5) is intended to house the printing surface (3). Thus, when the movable support (5) moves by means of the displacement mechanism (6), the printing surface (3) also moves, in order to place it in position to receive a new layer of printing material on the part that is being produced on said printing surface (3).

The conveying module (4), therefore, produces a vertical movement on the printing surface (3) in order to enable the part to be produced layer by layer and said printing surface (3) to be removed during a material supply process, in order to do it safely.

The displacement mechanism (6) has four spindles (7) through which four guide elements (8) which hold the movable support (5) of the conveying module (4) move. The guide elements (8) of the displacement mechanism (6) enable the movement of the movable support (5) and the printing surface (3).

Figure 3:
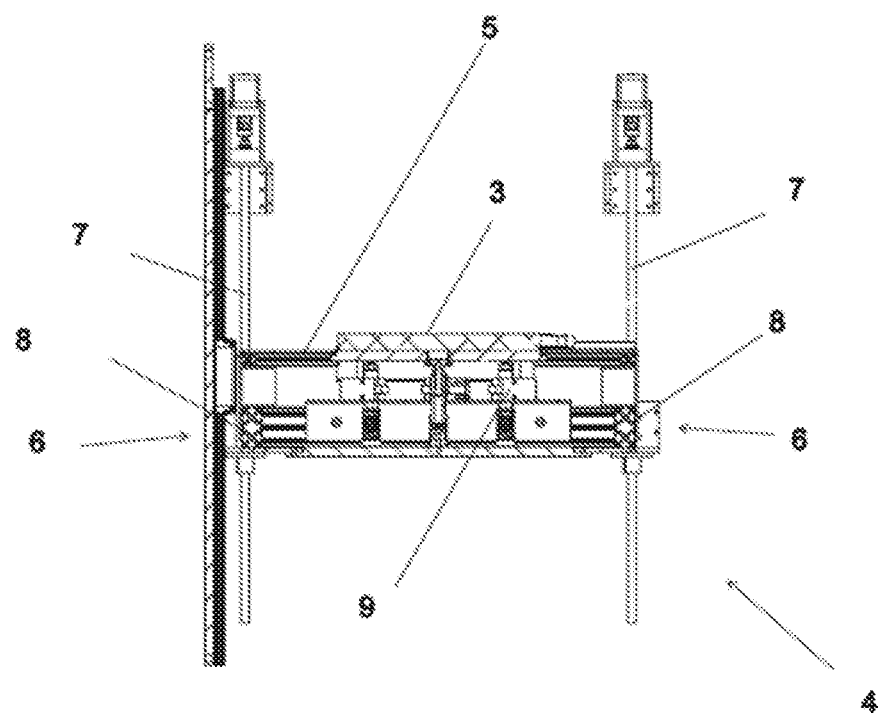
FIG. 3 shows a front view of a preferred embodiment of the conveying module.

FIG. 3 shows a front view of the conveying module (4), which further comprises an automatic levelling mechanism (9). The automatic levelling mechanism (9) is intended to enable the fine adjustment in the positioning of the printing surface (3) with respect to the conveyor substrate (2).

The ultraviolet light source (10) is, in this case, a DLP projector and is intended to produce a light beam with a predetermined shape in order to cure the printing material on the part to be built. In this case, the printing material is high viscosity photosensitive resin, with a viscosity greater than 2000 cps (mPa*s) at 25° C., curable by means of ultraviolet light.

The projector is attached to the structure (1) by means of a support that enables the movement thereof in the three directions of space, in order to correctly calibrate the focus of the light beam produced. In this way, high precision is achieved in the production of each layer of the part to be built.

The machine shown in FIG. 1 further comprises two reservoirs (11) of material that are each intended to contain a printing material, which can be the same, or, preferably, different. The reservoirs (11) of material are fixed to the structure (1) and are refillable.

Figure 4:
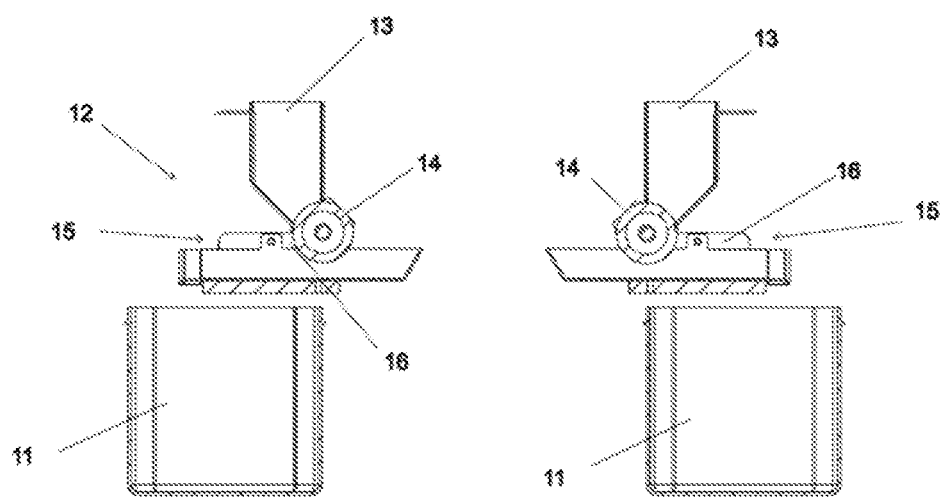
FIG. 4 shows a schematic view of a preferred embodiment of the material supply module.

FIG. 4 shows a front view of the material supply modules (12). Each material supply module (12) of the machine is responsible for supplying the printing material, the photosensitive resin, towards the conveyor substrate (2). The material supply module (12) comprises in this case a cartridge (13) and a supply roller (14).

Each material supply module (12) is connected to one of the two reservoirs (11), so that the printing material contained in the reservoir (11) is supplied to the cartridge (13) of the material supply module (12).

Once in the cartridge, the printing material is dosed on the conveyor substrate (2) by using the supply roller (14) of the material supply module (12). As it rotates, the supply roller (14) supplies a layer of printing material in a continuous and controlled manner to the conveyor substrate (2).

Figure 5:
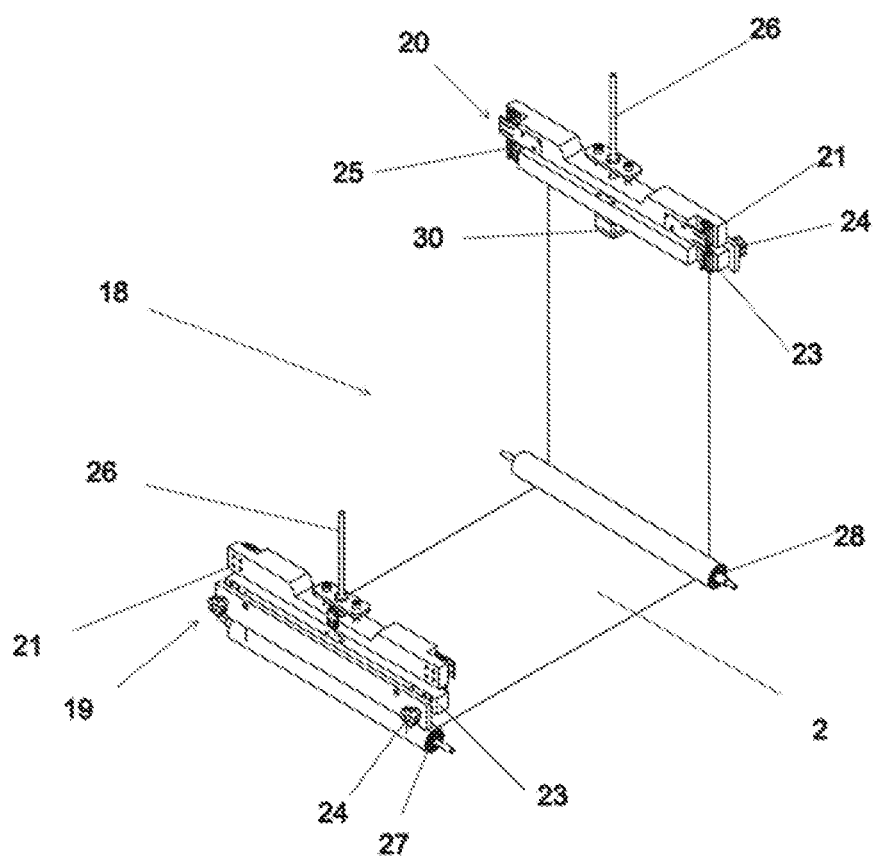
FIG. 5 shows a schematic view of a preferred embodiment of the fastening system.

FIG. 5 shows the fastening system (18) of the machine of the invention in a preferred embodiment. The fastening system (18) is intended to hold the conveyor substrate (2) in position.

For this, it comprises two fixing elements (19, 20), two rotating elements, in this case, fixed rollers (27, 28) and two displacement motors (25). In this case, the fixing elements (19, 20) comprise an upper block (21) and a lower block (23).

Figure 6:
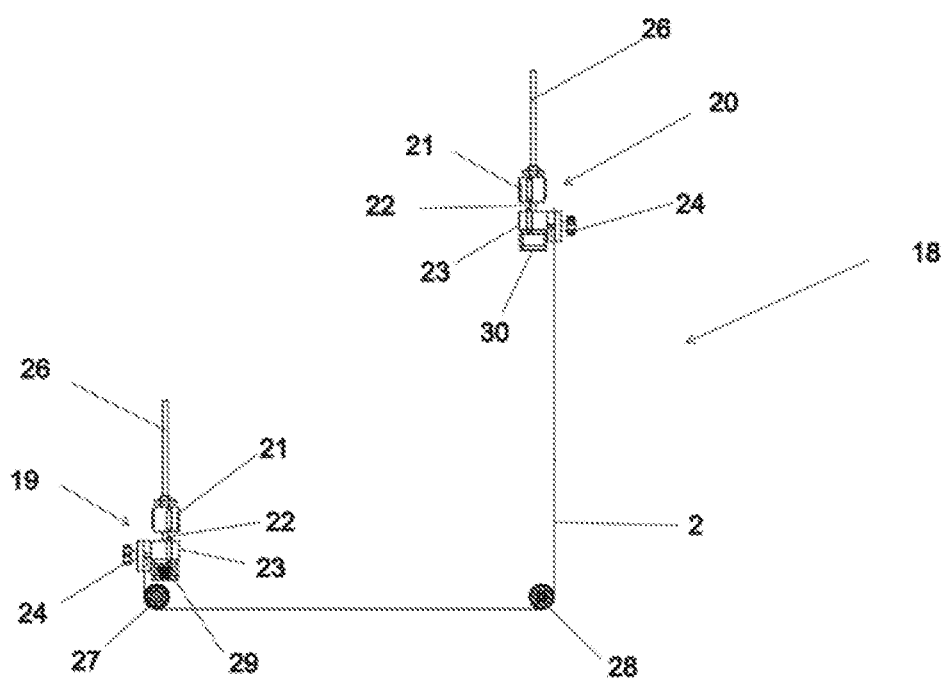
FIG. 6 shows a front view of a preferred embodiment of the fastening system.

FIG. 6 shows a front view of the fastening system (18) and, in particular, of the upper block (21) and lower block (23) of the fixing elements (19, 20). The upper block (21) of each fixing element (19, 20) is of the clamp type and enables the conveyor substrate (2) to be held by means of an adjustable screw (24).

In the lower block (23), each fixing element (19, 20) houses one of the self-tensioning motors (29, 30) of the fastening system (18) that enables the movement of the fixing elements (19, 20) and, therefore, of the conveyor substrate (2). Additionally, the lower block (23) also houses a self-tensioning motor (29, 30) that enables the necessary tension to be automatically provided on the conveyor substrate (2). Furthermore, in the lower block (23) a tilting element (22) is further arranged in order to align the conveyor substrate (2).

The fixing elements (19, 20) are intended to move each of the two ends of the conveyor substrate (2), in order to produce movement in the same. Thus, in the movement of said fixing elements (19, 20), if one of the two is lifted, the other is lowered the same distance and vice versa. The movement of the fixing elements (19, 20) is carried out along two linear guides (26).

Moreover, the fixed rollers (27, 28) of the fastening system (18) serve as support points in the path of the conveyor substrate (2). To do this, they are fixed to the structure (1), so that the only degree of freedom of movement thereof is the rotation on themselves. Then, the conveyor substrate (2) rests on both fixed rollers (27, 28) and when the fixing element (19) located on the left side is lowered, and therefore the fixing element (20) located on the right side is lifted, the fixed rollers (27, 28) rotate on themselves anticlockwise in order to enable the smooth movement of the conveyor substrate (2), maintaining a U-shape in the placement thereof with respect to the structure (1).

FIG. 1 also shows the relative position of the material supply module (12) with respect to the fixed roller (27, 28) of the fastening system (18). Thus, the supply roller (14) of the material supply module (12) is located tangentially to the fixed roller (27, 28) of the fastening system (18) and moved with respect to it a distance equal to the desired layer thickness to be placed on the conveyor substrate (2) by means of the material supply module (12). Thus, as the supply roller (14) rotates, it supplies a layer of material with a controlled thickness on the conveyor substrate (2).

In order to vary the thickness of the layer of material supplied to the conveyor substrate (2), the material supply module (12) further comprises a thickness control module (15) which in turn comprises a runner (16) and a supply motor (17). The runner (16) is connected to the supply roller (14) and moves linearly by means of the supply motor (17), in a horizontal direction, thus modifying the thickness of the layer of material supplied.

Figure 7:
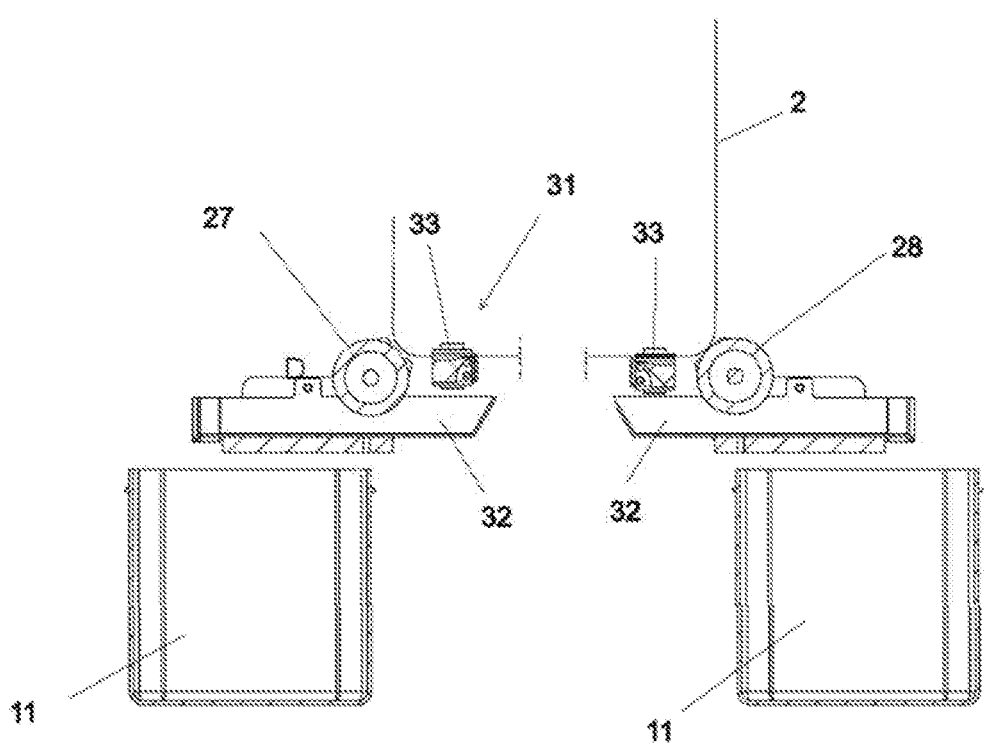
FIG. 7 shows a schematic view of a preferred embodiment of the material collection module.

FIG. 7 shows a front view of the material collection module (31), which is coupled with the material supply module (12). The material collection module (31) comprises a material collection tray (32), a spatula (33), a recirculation conduit and a filter. The spatula (33) of the material collection module (31) moves closer to the surface of the conveyor substrate (2) once the curing of one layer of the part to be built has been completed. Thus, the movement of the conveyor substrate (2) forces the uncured printing material to come into contact with the spatula (33) which removes it from the conveyor substrate (2) and enables it to fall onto the material collection tray (32). Once in the material collection tray (32), the excess material is directed towards the recirculation conduit and is filtered, by means of the filter. The recirculation conduit conveys the excess material to the cartridge (13) or the reservoir (11) in order to reuse it later.

Figure 8:
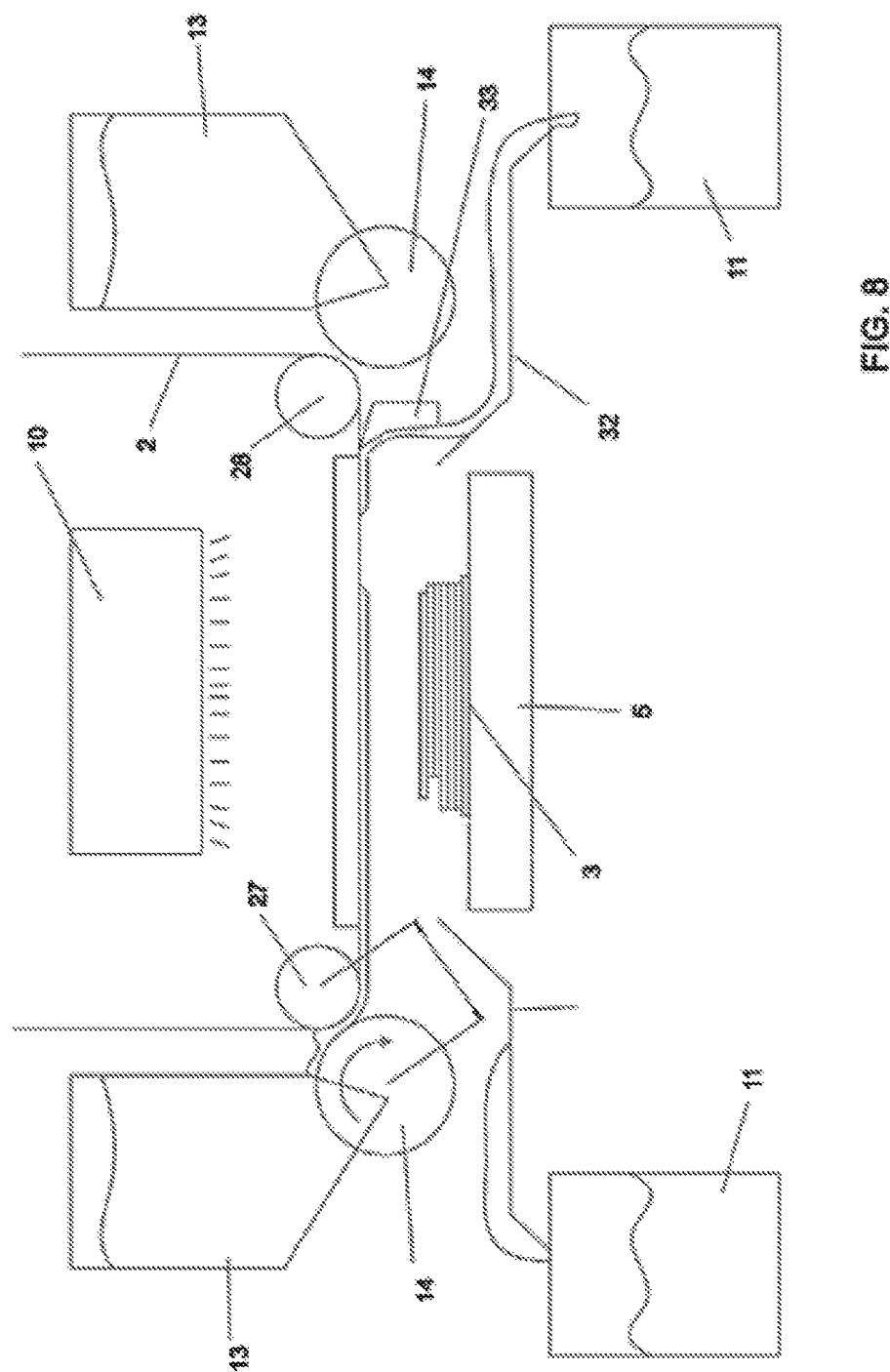
FIG. 8 shows a schematic view of a preferred embodiment of the method of additive manufacturing of the invention.

FIG. 8 shows a diagram of a preferred embodiment of the method of additive manufacturing of the invention.

FIG. 8 shows the conveyor substrate (2) placed on the fixed rollers (27, 28) of the fastening system (18) and tensioned in order to move with the movement of the fixing elements (19, 20).

The ultraviolet light source (10) is activated in order to enable the printing material to cure.

Then the position of the material supply module (12) is calibrated in order to set the layer thickness to be supplied, moving the outer surface of the supply roller (14) of the material supply module (12) closer to or away from the fixed roller (27, 28) of the corresponding fastening system (18).

Then, the movement of the conveyor substrate (2) is started, in this case the fixing element (19) on the left side being lowered and the fixing element (20) on the right side being lifted. At the same time, the supply roller (14) is activated, which begins to rotate on itself supplying a layer of printing material with controlled thickness on the conveyor substrate (2).

Once the layer of printing material has been supplied on the conveyor substrate (2), along a previously determined working length, the printing surface (3) moves upwards by means of the conveying module (4), being at a distance from the conveyor substrate (2) equal to the set of thicknesses already produced in the part plus the thickness of the new layer supplied on the conveyor substrate (2).

When the printing surface (3) is located in the position thereof, the printing material from the conveyor substrate (2) is irradiated in order to cure it in a certain way. Then, the printing surface (3) is separated by moving it downwards by means of the conveying module (4).

The movement of the conveyor substrate (2) resumes in the same direction as in the case of the material supply and the material collection module (31) is activated at the same time, which, by means of the spatula (33) enables the uncured material to be removed from the conveyor substrate (2), directing it towards the material collection tray (32) and, finally, sending it back to the reservoir (11).

Figure 9:
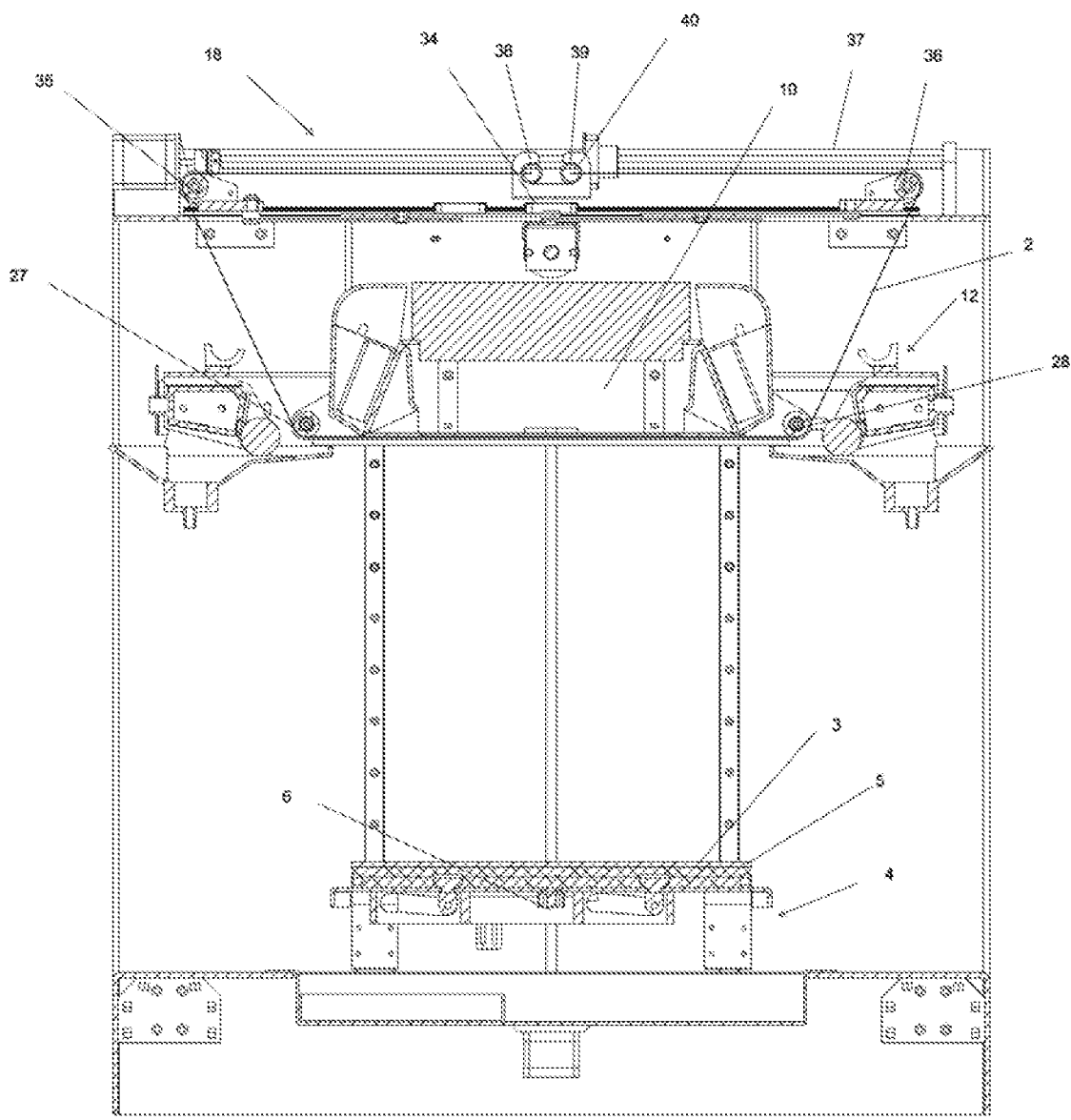
FIG. 9 shows a schematic view of a second preferred embodiment of the machine of the invention.

FIG. 9 shows a schematic view of a second preferred embodiment of the machine of the invention, in which the conveyor substrate (2) is positioned in an O-shape. Thus, the fastening system (18) comprises a central and movable fixing element (34) and four rotating elements (27, 28, 35, 36), two upper rotating elements (35, 36) and two lower ones (27, 28).

The central and movable fixing element (34) of the fastening system (18) is located on linear guides (37) and holds the conveyor substrate (2) at two ends to the structure (1) at an upper level and parallel to the working surface (3). The fixing element (34) moves on the linear guides (37) alternately, in two directions, left and right, to produce a movement in the conveyor substrate (2).

In this case, the substrate (2) is connected to the central and movable fixing element (34) by means of two connecting bars (38, 39) that are fixed to the two ends of the substrate (2) by means of a clip, and they are connected to the fixing element (34) by means of two C-shaped fixing elements (40, 41).

Thus, from the central and movable fixing element (34), the conveyor substrate (2) extends in a horizontal direction towards a first rotating element (35), changes direction by resting on said first rotating element (35), and extends in a vertical direction, downwards, with a certain inclination towards a second rotating element (27), the substrate (2) resting on said second rotating element (27), changes direction once more and extends in a horizontal direction going across the working surface (3) towards a third rotating element (28), resting on this rotating element (28), changes direction and extends upwards in a vertical direction with a certain inclination, symmetrical to the downward inclination, and rests on a fourth rotating element (36) and extends in a horizontal direction to be held by a second end to the central and movable fixing element (34).

Figure 10:
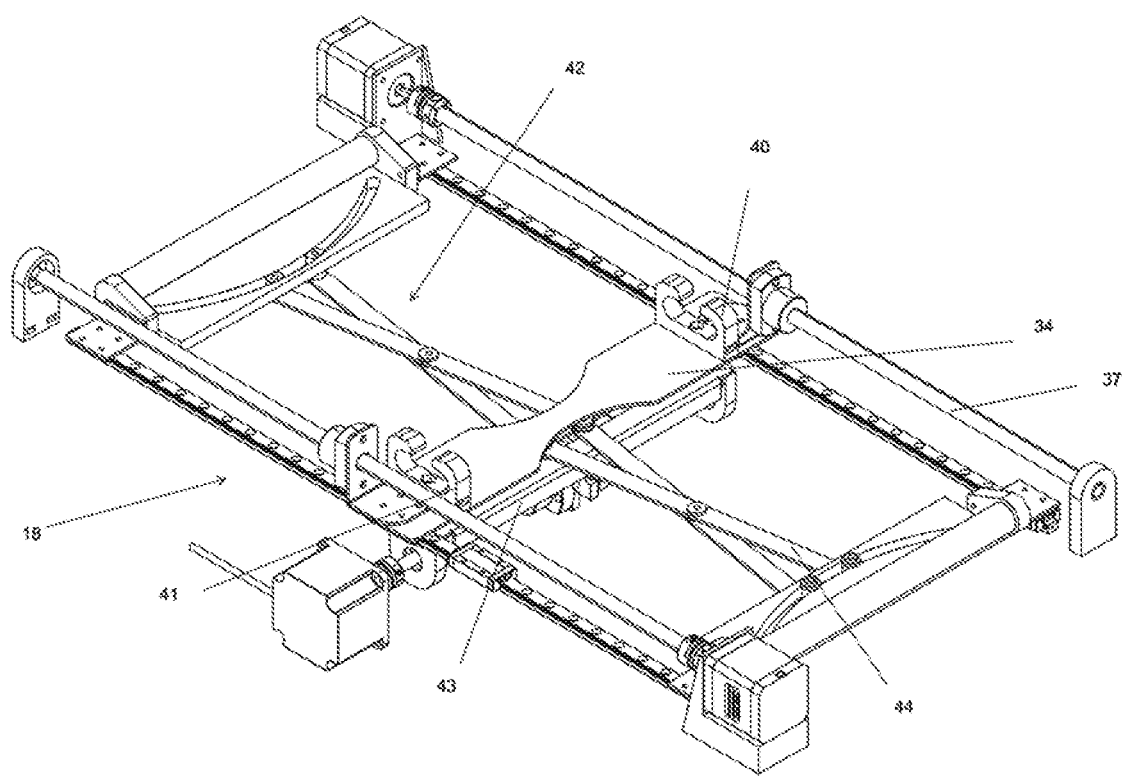
FIG. 10 shows a schematic view of a second preferred embodiment of the fastening system of the invention.

FIG. 10 shows a schematic view of a second preferred embodiment of the fastening system (18) of the invention. This figure shows a tensioning system (42) comprised by the machine, connected to the two upper rotating elements (35, 36). The tensioning system (42) is, in this case, a scissor-type mechanism (44) that enables the upper rotating elements (35, 36) to move closer to or away from each other through the movement of a central transverse spindle (43). Thus, the tensioning system (18) is compressed when placing the conveyor substrate (2), that is, the rotating elements (35, 36) are brought closer together, and once the substrate (2) is placed, they move away until the desired tension is reached, preferably until motor step losses are detected.

The invention claimed is:

1. A machine for additive manufacturing, wherein a printing direction is of a top-down type, comprising:
    a structure;
    a conveying module comprising a movable support configured to house a printing surface on which a part is printed to move it in a vertical direction, and a displacement mechanism connected to the structure;
    at least one light source fixed to the structure;
    at least one reservoir of material, located in the structure and configured to contain a printing material;
    a material supply module connected to the reservoir of material and configured to apply a layer of printing material on a conveyor substrate configured for conveying the printing material from the material supply module to the printing surface; and
    a fastening system having an O-shape configuration comprising:
        a fixing element, located on linear guides and configured to hold the conveyor substrate at two ends to the structure at an upper level and parallel to the printing surface and to move on the linear guides alternatively, in two directions, to produce a movement in the conveyor substrate, and wherein the substrate is configured to be arranged in an O-shape;
        four rotating elements with respect to the structure configured to serve as support points for the conveyor substrate, and which rotate on themselves to enable the movement of the conveyor substrate, wherein the four rotating elements include two upper rotating elements and two lower rotating elements;
        one or more displacement motors which move the fixing element to move the conveyor substrate; and
        a tensioning system connected to the two upper rotating elements and configured to move the upper rotating elements closer to or away from each other through the movement of a central transverse spindle.

2. The machine for additive manufacturing according to claim 1, wherein the light source is one of a projector, a screen, and a laser.

3. The machine for additive manufacturing according to claim 1, wherein the light source is at least one of ultraviolet light and visible light.

4. The machine for additive manufacturing according to claim 1, wherein the conveying module comprises at least one of an automatic levelling mechanism, system, and routine with a positioning frame that enables the positioning of the printing surface to be adjusted.

5. The machine for additive manufacturing according to claim 1, wherein the displacement mechanism of the conveying module comprises one or more spindles that transmit a movement guided by linear guide elements connected to the movable support.

6. The machine for additive manufacturing according to claim 1, wherein the printing surface and the movable support form a single part.

7. The machine for additive manufacturing according to claim 1, wherein the substrate is connected to the central and movable fixing element with two connecting bars that are fixed to the two ends of the substrate and are connected to the fixing element with two C-shaped fixing elements.

8. The machine for additive manufacturing according to claim 1, wherein the material supply module comprises a cartridge and a material supply roller, located tangentially to at least one of the rotating elements of the fastening system.

9. The machine for additive manufacturing according to claim 8, wherein the material supply module further comprises a thickness control module, which comprises a runner, connected to the cartridge and to the supply roller and which moves linearly, and a supply motor, that drives the movement of the runner.

10. The machine for additive manufacturing according to claim 1, further comprising a material collection module in addition to an excess material collection tray, a material filter and a recirculation conduit, which directs the collected material towards the cartridge or towards the reservoir.

11. The machine for additive manufacturing according to claim 10, wherein the material collection module comprises a spatula, placed near the conveyor substrate so that it presses the same to recover the excess material.

12. The machine for additive manufacturing according to claim 11, wherein the material collection module further comprises an activation mechanism connected to the spatula, which enables it to move closer to or be removed from the conveyor substrate.

13. The machine for additive manufacturing according to claim 1, wherein the material used is photosensitive resin with a viscosity greater than or equal to 2000 cps (mPa*s) at 25° C.

14. The machine for additive manufacturing according to claim 1, wherein the material used is photosensitive resin filled with reinforcement material.

15. The machine for additive manufacturing according to claim 1, wherein the light source is located above a working surface.

16. The machine for additive manufacturing according to claim 1, wherein it further comprises a cleaning module, comprising two rollers having a soft material arranged thereon, a cleaning motor for moving the rollers and a cleaning substrate that extends over the two rollers in a circular shape, such that it can rotate continuously.

17. A method of additive manufacturing, wherein a printing direction is of a top-down type, that makes use of the machine for additive manufacturing according to claim 1, comprising the steps of:
  a) providing the conveyor substrate placed in the fastening system;
  b) tensioning the conveyor substrate with the fastening system;
  c) activating the at least one light source;
  d) placing the material supply module at a distance equal to the desired layer thickness of the conveyor substrate;
  e) moving the fastening system by moving the fixing element linearly on the linear guides;
  f) supplying printing material on the conveyor substrate along a working length, from the material supply module located under at least one of the two lower rotating elements;
  g) lifting the printing surface to a distance from the conveyor substrate equal to the thickness of produced layers plus the thickness of a new layer;
  h) irradiating the uncured printing material with the at least one light source producing a predetermined shape, curing a layer;
  i) lowering the conveying module, peeling the cured layer off the conveyor substrate; and
  j) repeating steps e) to i).

18. The method according to claim 17, wherein it further comprises a step prior to activating the at least one light source, of ensuring the coplanarity of the conveying module with the conveyor substrate with at least one of an automatic levelling mechanism, system, and routine.

19. The method according to claim 17, wherein in the step of supplying material on the conveyor substrate, once the printing material has been supplied in a working area of the conveyor substrate, the movement of the fastening system is continued without supplying more printing material.

20. The method according to claim 17, wherein it further comprises the step of activating a material collection module, removing the uncured material to reintroduce it into the material supply module.

21. The method according to claim 17, wherein a first cartridge contains a first printing material and at least one second cartridge comprises a second printing material, so that the printing materials are a printing material is alternately supplied in each movement of the conveyor substrate.

22. The method according to claim 21, wherein the step of moving the conveying module towards the conveyor substrate in the supply of the second printing material is carried out up to a distance equal to the set of thicknesses already printed, so that the second printing material is added to the same layer as the first printing material.

23. The method according to claim 21, wherein it further comprises the step of activating a cleaning module, to avoid contamination of the materials.

\* \* \* \* \*